United States Patent
Lin et al.

(10) Patent No.: US 10,999,107 B1
(45) Date of Patent: May 4, 2021

(54) VOLTAGE MODE TRANSMITTER (71) Applicant: Novatek Microelectronics Corp., Hsinchu County (TW)

(72) Inventors: Shih-Chun Lin, Kaohsiung (TW); Ming-Hung Chien, Taichung (TW); Shu-Chin Chuang, Tainan (TW)

(73) Assignee: Novatek Microelectronics Corp., Hsinchu County (TW)

( * ) Notice: Subject to any disclaimer, the term of this patent is extended or adjusted under 35 U.S.C. 154(b) by 0 days.

(21) Appl. No.: 16/946,250

(22) Filed: Jun. 12, 2020

(51) Int. Cl.
*H04L 25/02* (2006.01)
*H04L 25/03* (2006.01)

(52) U.S. Cl.
CPC ........ *H04L 25/0278* (2013.01); *H04L 25/028* (2013.01); *H04L 25/0272* (2013.01); *H04L 25/03885* (2013.01)

(58) Field of Classification Search
None
See application file for complete search history.

(56) References Cited

U.S. PATENT DOCUMENTS

| | | | | |
|---|---|---|---|---|
| 6,960,931 | B2* | 11/2005 | Turcotte | H03K 17/164 326/30 |
| 7,135,884 | B1* | 11/2006 | Talbot | H03K 17/164 326/30 |
| 2008/0049872 | A1* | 2/2008 | Fourtou | H03F 1/56 375/317 |
| 2012/0025800 | A1* | 2/2012 | Dettloff | H04L 25/0278 323/299 |
| 2020/0162290 | A1* | 5/2020 | Ramirez | H04L 25/0272 |

* cited by examiner

*Primary Examiner* — Anh Q Tran
(74) *Attorney, Agent, or Firm* — TraskBritt (57) ABSTRACT

A voltage mode transmitter includes a first output terminal, a second output terminal, and a plurality switch-resistor units between the first output terminal and a first voltage source, between the second output terminal and the first voltage source, between the first output terminal and a second voltage source, and between the second output terminal and the second voltage source. Each switch-resistor unit includes a switch and a resistor connected in series. The switches of the switch-resistor units are controlled such that a common-mode voltage of a differential signal outputted at the first and second output terminals deviates from an average of voltages provided by the first and second voltage sources.

10 Claims, 5 Drawing Sheets

VOLTAGE MODE TRANSMITTER

FIELD

The disclosure relates to a transmitter, and more particularly to a voltage mode transmitter having an adjustable common-mode voltage.

BACKGROUND

In differential signaling, a differential signal transmitted from a transmitter to a receiver by direct-current (DC) coupling must have a common-mode voltage that is at a voltage level required by the receiver, so as to ensure that the receiver can operate normally and receive the differential signal correctly. However, different receivers may require different common-mode voltages, so the transmitter may need to perform corresponding adjustments.

SUMMARY

Therefore, an object of the disclosure is to provide a voltage mode transmitter that is able to adjust the common-mode voltage.

According to the disclosure, the voltage mode transmitter includes a first output terminal, a second output terminal, a first impedance adjusting circuit, a second impedance adjusting circuit, a third impedance adjusting circuit and a fourth impedance adjusting circuit. The first impedance adjusting circuit includes a plurality of first switch-resistor units to make or break electric connection between the first output terminal and a first voltage source that provides a first voltage. Each of the first switch-resistor units includes a switch and a resistor that are connected in series between the first output terminal and the first voltage source. The second impedance adjusting circuit includes a plurality of second switch-resistor units to make or break electric connection between the second output terminal and the first voltage source. Each of the second switch-resistor units includes a switch and a resistor that are connected in series between the second output terminal and the first voltage source. The third impedance adjusting circuit includes a plurality of third switch-resistor units to make or break electric connection between the first output terminal and a second voltage source that provides a second voltage smaller than the first voltage. Each of the third switch-resistor units includes a switch and a resistor that are connected in series between the first output terminal and the second voltage source. The fourth impedance adjusting circuit includes a plurality of fourth switch-resistor units to make or break electric connection between the second output terminal and the second voltage source. Each of the fourth switch-resistor units includes a switch and a resistor that are connected in series between the second output terminal and the second voltage source. The switches of the first, second, third and fourth switch-resistor units are controlled such that a first output signal provided at the first output terminal and a second output signal provided at the second output terminal cooperatively form a differential signal that has a common-mode voltage, and the common-mode voltage deviates from an average of the first voltage and the second voltage.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
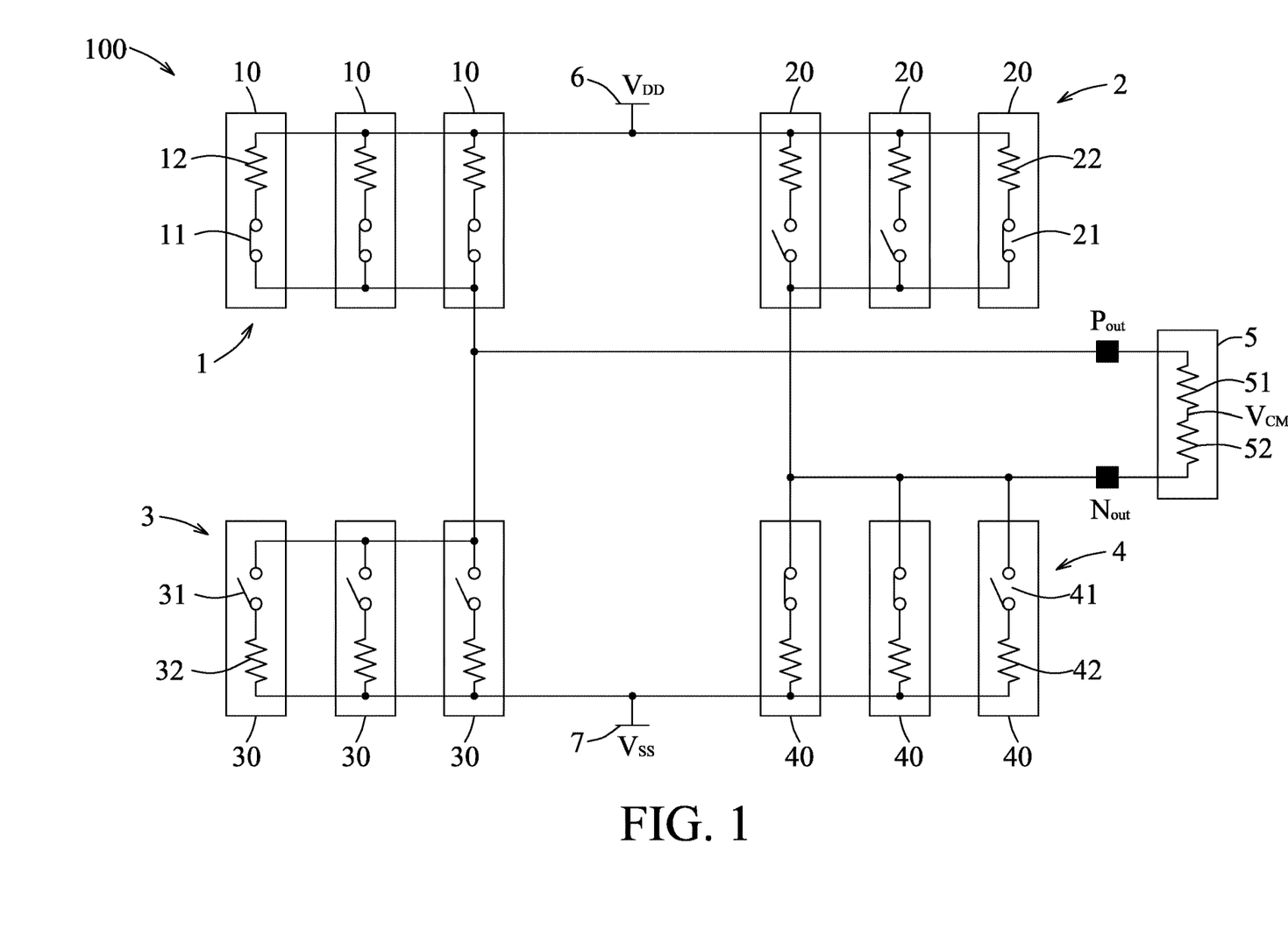
FIG. 1 is a schematic circuit diagram illustrating a first embodiment of a voltage mode transmitter according to the disclosure.

FIG. 1 illustrates a first embodiment of a voltage mode transmitter 100 according to this disclosure. The voltage mode transmitter 100 includes a first output terminal $P_{out}$ and a second output terminal $N_{out}$ that cooperatively output a differential signal to a load 5 (e.g., a receiver), and first to fourth impedance adjusting circuits 1, 2, 3, 4. Each of the elements 51, 52 represents an input resistance Rr of the load 5, and the elements 51, 52 are connected in series to provide a resistance of $2 \times R_M$ between the first and second output terminals $P_{out}$, $N_{out}$. A common value for the input resistance $R_M$ is 50 ohms, but this disclosure is not limited thereto.

The first impedance adjusting circuit 1 includes a plurality of first switch-resistor units 10 to make or break electric connection between the output terminal $P_{out}$ and a first voltage source 6 that provides a first voltage of $V_{DD}$. Each of the first switch-resistor units 10 includes a switch 11 and a resistor 12 that are connected in series between the first output terminal $P_{out}$ and the first voltage source 6.

The second impedance adjusting circuit 2 includes a plurality of second switch-resistor units 20 to make or break electric connection between the second output terminal $N_{out}$ and the first voltage source 6. Each of the second switch-resistor units 20 includes a switch 21 and a resistor 22 that are connected in series between the second output terminal $N_{out}$ and the first voltage source 6.

The third impedance adjusting circuit 3 includes a plurality of third switch-resistor units 30 to make or break electric connection between the first output terminal $P_{out}$ and a second voltage source 7 that provides a second voltage of $V_{SS}$, smaller than the first voltage. Each of the third switch-resistor units 30 includes a switch 31 and a resistor 32 that are connected in series between the first output terminal $P_{out}$ and the second voltage source 7. In this embodiment, the second voltage source 7 is ground and the second voltage is assumed to be zero volts, but this disclosure is not limited thereto.

The fourth impedance adjusting circuit 4 includes a plurality of fourth switch-resistor units 40 to make or break electric connection between the second output terminal $N_{out}$ and the second voltage source 7. Each of the fourth switch-resistor units 40 includes a switch 41 and a resistor 42 that are connected in series between the second output terminal $N_{out}$ and the second voltage source 7.

The switches 11, 21, 31, 41 of the first, second, third and fourth switch-resistor units 10, 20, 30, 40 are controlled by a front-end circuit (not shown) such that a first output signal provided at the first output terminal $P_{out}$ and a second output signal provided at the second output terminal $N_{out}$ cooperatively form the differential signal that has a common-mode voltage of $V_{CM}$, and the common-mode voltage deviates from an average of the first voltage and the second voltage.

A first number of the first switch-resistor units 10 out of all of the first switch-resistor units 10, a second number of the second switch-resistor units 20 out of all of the second switch-resistor units 20, a third number of the third switch-resistor units 30 out of all of the third switch-resistor units 30, and a fourth number of the fourth switch-resistor units 40 out of all of the fourth switch-resistor units 40 are simultaneously controlled to permit current to flow therethrough, and three or all of the first number, the second number, the third number and the fourth number are greater than zero at any given time during operation of the voltage mode transmitter 100. In other words, at any given time during operation of the voltage mode transmitter 100, three or all of the first, second, third and fourth impedance adjusting circuits 1, 2, 3, 4 make electric connection (i.e., permit current to flow therethrough).

In one implementation, the resistors 12, 22, 32, 42 all have the same resistance of $N \times R_M$, and a sum of the first number and the third number is equal to a sum of the second number and the fourth number and is equal to N. However, the first number is different from the fourth number, and the second number is different from the third number.

As an example, assuming that the first impedance adjusting circuit 1 includes three first switch-resistor units 10, the second impedance adjusting circuit 2 includes three second switch-resistor units 20, the third impedance adjusting circuit 3 includes three third switch-resistor units 30, and the fourth impedance adjusting circuit 4 includes three fourth switch-resistor units 40, FIG. 1 shows an exemplary condition where the switches 11, 21, 31, 41 of the voltage mode transmitter 100 are controlled to output the differential signal of logic 1 to the load 5. In detail, all of the switches 11 conduct (i.e., the first number is 3), one of the switches 21 conducts (i.e., the second number is 1), none of the switches 31 conducts (i.e., the third number is 0), and two of the switches 41 conduct (i.e., the fourth number is 2). Each of the resistors 12, 22, 32, 42 have the same resistance of $3 \times R_M$ (i.e., N=3).

Figure 2:
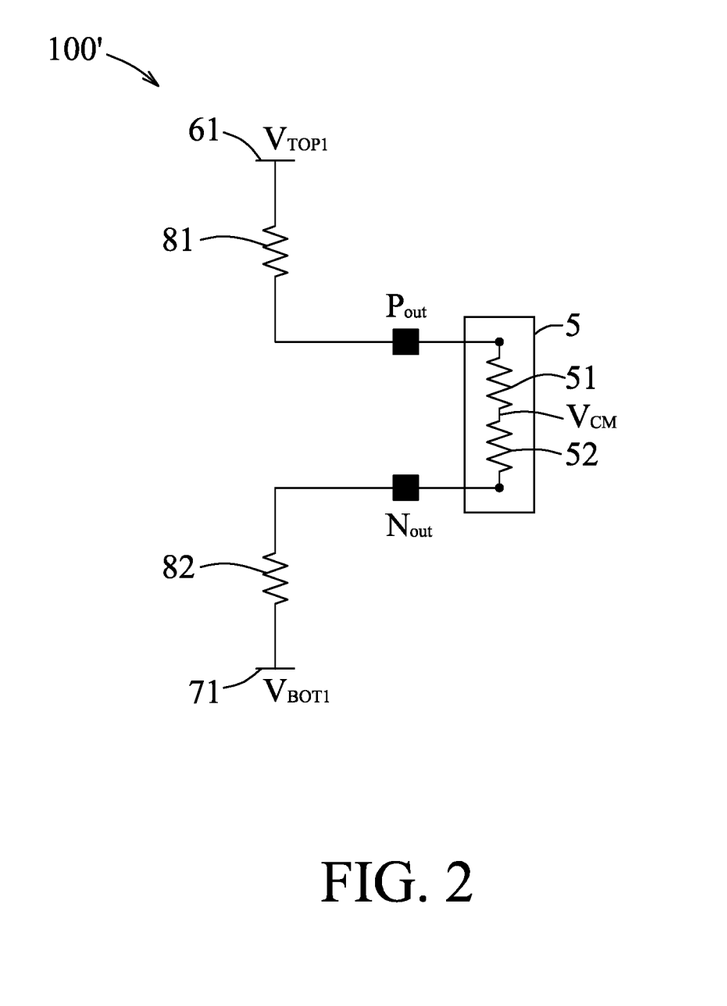
FIG. 2 is a schematic circuit diagram illustrating an equivalent circuit of FIG. 1.

FIG. 2 illustrates an equivalent circuit 100' of FIG. 1 according to the Thevenin's theorem. The equivalent circuit 100' includes a first equivalent resistor 81 coupled between the first output terminal $P_{out}$ and a first equivalent voltage source 61 providing a first equivalent voltage of $V_{TOP1}$, and a second equivalent resistor 82 coupled between the second output terminal $N_{out}$ and a second equivalent voltage source 71 providing a second equivalent voltage of $V_{BOT1}$. The first equivalent resistor 81 represents an output resistance seen into the first output terminal $P_{out}$, and has a resistance of $R_{81}=R_{12}/R_{12}//R_{12}=R_M$, where $R_{81}$ represents the resistance of the first equivalent resistor 81, and $R_{12}$ represents a resistance of each of the resistors 12. The second equivalent resistor 82 represents an output resistance seen into the second output terminal $N_{out}$, and has a resistance of $R_{82}=R_{22}//R_{42}//R_{42}=R_M$, where $R_{82}$ represents the resistance of the second equivalent resistor 82, $R_{22}$ represents a resistance of each of the resistors 22, and $R_{42}$ represents a resistance of each of the resistors 42. Accordingly, the first and second equivalent resistors 81, 82 have the same resistance of $R_M$, matching the input resistance of the load 5. The first equivalent voltage is equal to the first voltage (i.e., $V_{TOP1}=V_{DD}$). The second equivalent voltage can be calculated as:

$$V_{BOT1} = (V_{DD} - V_{SS}) \times \frac{(R_{42} // R_{42})}{R_{22} + (R_{42} // R_{42})} + V_{SS} = \frac{1}{3}(V_{DD} - V_{SS}) + V_{SS}$$

In this embodiment, $V_{SS}$=0V, so $V_{BOT1}=V_{DD}/3$, causing the common-mode voltage of the differential signal, which is equal to the average of the first and second equivalent voltages, to deviate from and be greater than the average of the first voltage and the second voltage. Similarly, when the differential signal that represents logic 0 and that has the same common-mode voltage is to be outputted, it can be controlled that the first number be 1, the second number be 3, the third number be 2, and the fourth number be 0.

In a case of making the common-mode voltage of the differential signal smaller than the average of the first voltage and the second voltage while maintaining an output resistance of the voltage mode transmitter 100 to be $R_M$, the third number can be set to be greater than zero when outputting the differential signal of logic 1 (while the second number and the fourth number are respectively set to 0 and 3); and similarly, the fourth number can be set to be greater than zero when outputting the differential signal of logic 0 (while the first number and the third number are respectively set to 0 and 3).

Figure 3:
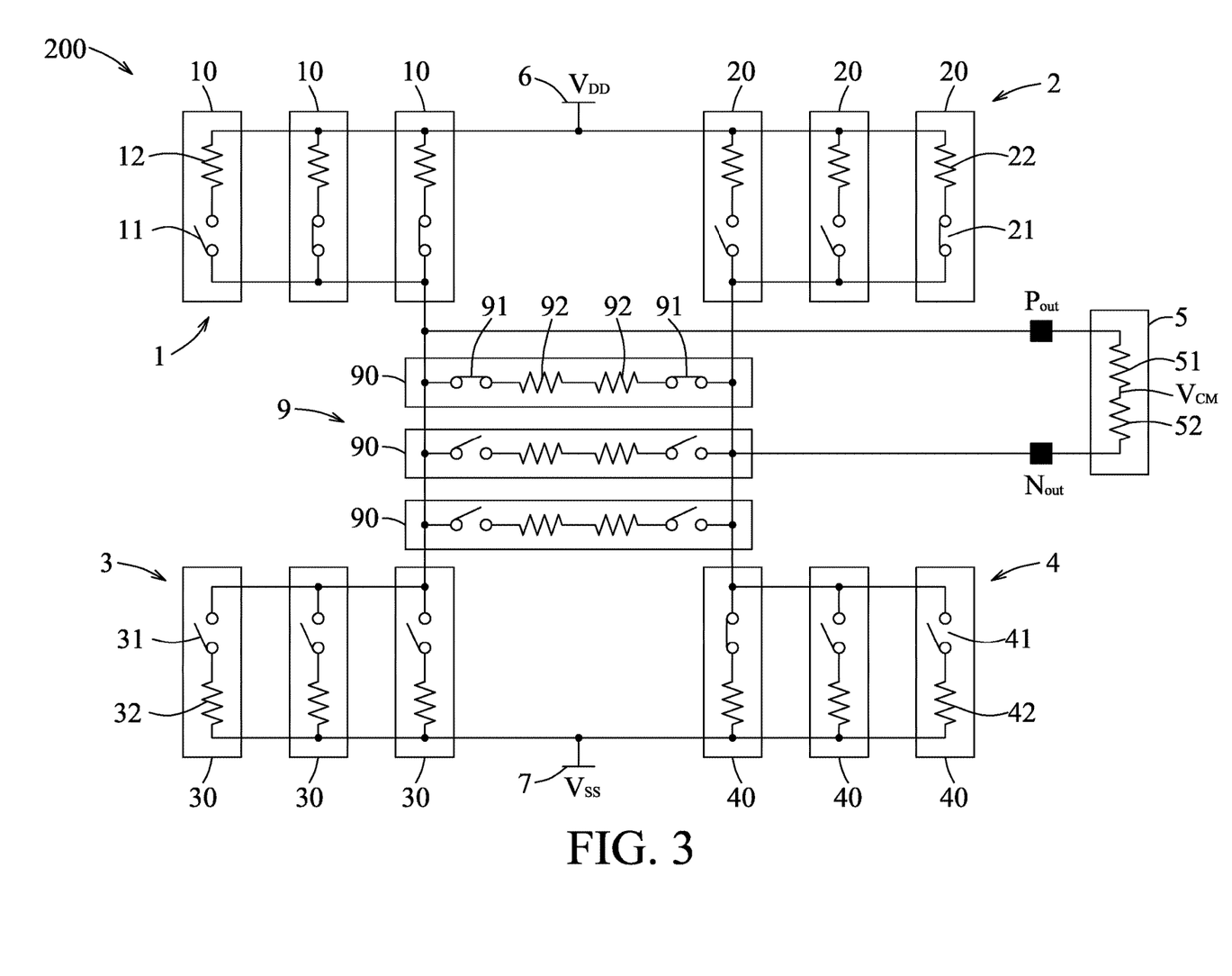
FIG. 3 is a schematic circuit diagram illustrating a variation of the first embodiment.

FIG. 3 shows a voltage mode transmitter 200, which is a variation of the first embodiment. The voltage mode transmitter 200 differs from the voltage mode transmitter 100 (see FIG. 1) in that the voltage mode transmitter 200 further includes a fifth impedance adjusting circuit 9. The fifth impedance adjusting circuit 9 includes a plurality of fifth switch-resistor units 90 to permit a current to flow between the first output terminal $P_{out}$ and the second output terminal $N_{out}$ through the fifth impedance adjusting circuit 9. Each of the fifth switch-resistor units 90 includes at least one switch 91 and at least one resistor 92 that are connected in series between the first output terminal $P_{out}$ and the second output terminal $N_{out}$, and the at least one switch 91 of at least one of the fifth switch-resistor units 90 conducts at any given time during operation of the voltage mode transmitter 200. A total resistance of said at least one resistor 92 of each of the fifth switch-resistor units 90 is twice the resistance of each of the resistors 12, 22, 32, 42 of the first, second, third and fourth switch-resistor units 10, 20, 30, 40. The fifth switch-resistor units 90 can be used to adjust a voltage swing of the differential signal outputted at the first and second output terminals $P_{out}$, $N_{out}$.

A first number of the first switch-resistor units 10 out of all of the first switch-resistor units 10, a second number of the second switch-resistor units 20 out of all of the second switch-resistor units 20, a third number of the third switch-resistor units 30 out of all of the third switch-resistor units 30, a fourth number of the fourth switch-resistor units 40 out of all of the fourth switch-resistor units 40, and a fifth number of the fifth switch-resistor units 90 out of all of the fifth switch-resistor units 90 are simultaneously controlled to permit current to flow therethrough, where the fifth number and three or all of the first number, the second number, the third number and the fourth number are greater than zero. In other words, the fifth impedance adjusting circuits 9 and three or all of the first, second, third and fourth impedance adjusting circuits 1, 2, 3, 4 make electric connection (i.e., permit current to flow therethrough) at any given time during operation of the voltage mode transmitter 200.

In one implementation as exemplified in FIG. 3, each fifth switch-resistor unit 90 includes two switches 91, and two resistors 92 that are connected in series between the switches 91; the resistors 12, 22, 32, 42, 92 all have the same resistance of N×R$_M$; and a sum of the first number, the third number and the fifth number is equal to a sum of the second number, the fourth number and the fifth number, and is equal to N. However, the first number is different from the fourth number, and the second number is different from the third number.

In more detail, it is exemplified in FIG. 3 that the first impedance adjusting circuit 1 includes three first switch-resistor units 10, the second impedance adjusting circuit 2 includes three second switch-resistor units 20, the third impedance adjusting circuit 3 includes three third switch-resistor units 30, the fourth impedance adjusting circuit 4 includes three fourth switch-resistor units 40, and the fifth impedance adjusting circuit 9 includes three fifth switch-resistor units 90. FIG. 3 shows an exemplary condition where the switches 11, 21, 31, 41, 91 of the voltage mode transmitter 200 are controlled to output the differential signal of logic 1 to the load 5. In detail, two of the switches 11 conduct (i.e., the first number is 2), one of the switches 21 conducts (i.e., the second number is 1), none of the switches 31 conducts (i.e., the third number is 0), one of the switches 41 conducts (i.e., the fourth number is 1), and the switches 91 of one of the fifth switch-resistor units 90 conduct (i.e., the fifth number is 1). Each of the resistors 12, 22, 32, 42, 92 have the same resistance of 3×R$_M$ (i.e., N=3).

Figure 4:
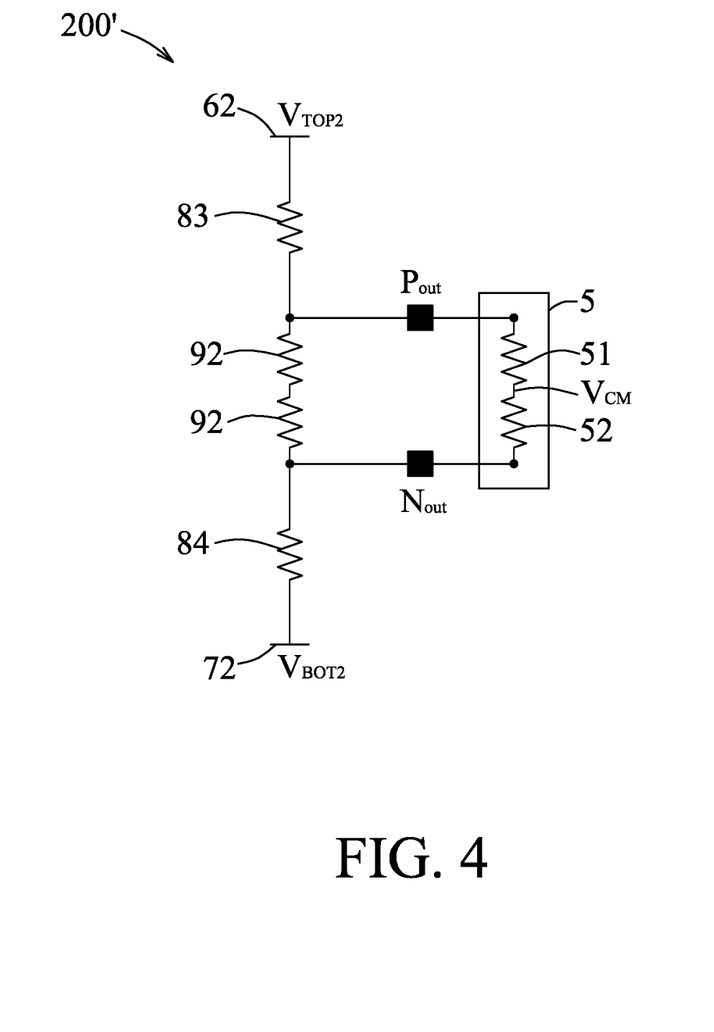
FIG. 4 is a schematic circuit diagram illustrating an equivalent circuit of FIG. 3.

FIG. 4 illustrates an equivalent circuit 200' of FIG. 3 according to the Thevenin's theorem. The equivalent circuit 200' includes a first equivalent resistor 83 coupled between the first output terminal P$_{out}$ and a first equivalent voltage source 62 providing a first equivalent voltage of V$_{TOP2}$, a second equivalent resistor 84 coupled between the second output terminal N$_{out}$ and a second equivalent voltage source 72 providing a second equivalent voltage of V$_{BOT2}$, and two resistors 92 coupled between the first output terminal P$_{out}$ and the second output terminal N$_{out}$. The first equivalent resistor 83 has a resistance of R$_{93}$=R$_{12}$//R$_{12}$, where R$_{83}$ represents the resistance of the first equivalent resistor 83, and R$_{12}$ represents a resistance of each of the resistors 12. The second equivalent resistor 84 has a resistance of R$_{84}$=R$_{22}$//R$_{42}$, where R$_{84}$ represents the resistance of the second equivalent resistor 84, R$_{22}$ represents a resistance of each of the resistors 22, and R$_{42}$ represents a resistance of each of the resistors 42. Note that, in each of the fifth switch-resistor units 90, the node between the two resistors 92 is equivalent to ground because of differential signaling. As a result, an output resistance seen into the first output terminal P$_{out}$ is equal to R$_{83}$//R$_{92}$=R$_M$, and an output resistance seen into the second output terminal N$_{out}$ is equal to R$_{84}$//R$_{92}$=R$_M$, both matching the input resistance of the load 5. The first equivalent voltage is equal to the first voltage (i.e., V$_{TOP2}$=V$_{DD}$). The second equivalent voltage can be calculated as:

$$V_{BOT2} = (V_{DD} - V_{SS}) \times \frac{R_{42}}{R_{22} + R_{42}} + V_{SS} = \frac{1}{2}(V_{DD} - V_{SS}) + V_{SS}$$

In this embodiment, V$_{SS}$=0V, so V$_{BOT2}$=V$_{DD}$/2, causing the common-mode voltage of the differential signal, which is equal to the average of the first and second equivalent voltages, to deviate from and be greater than the average of the first voltage and the second voltage. Similarly, when the differential signal that represents logic 0 and that has the same common-mode voltage is to be outputted, it can be controlled that the first number be 1, the second number be 2, the third number be 1, the fourth number be 0, and the fifth number be 1.

In a case of making the common-mode voltage of the differential signal outputted by this variation smaller than the average of the first voltage and the second voltage while maintaining an output resistance of the voltage mode transmitter 200 to be R$_M$, the third number can be set to be greater than zero when outputting the differential signal of logic 1 (while the second number, the fourth number and the fifth number are respectively 0, 2 and 1), and the fourth number can be set to be greater than zero when outputting the differential signal of logic 0 (while the first number, the third number and the fifth number are respectively 0, 2 and 1).

The first embodiment proposes an approach to adjusting the common-mode voltage of the differential signal outputted to the load 5 while maintaining the impedance matching, and is suitable for applications of high data rate.

Figure 5:
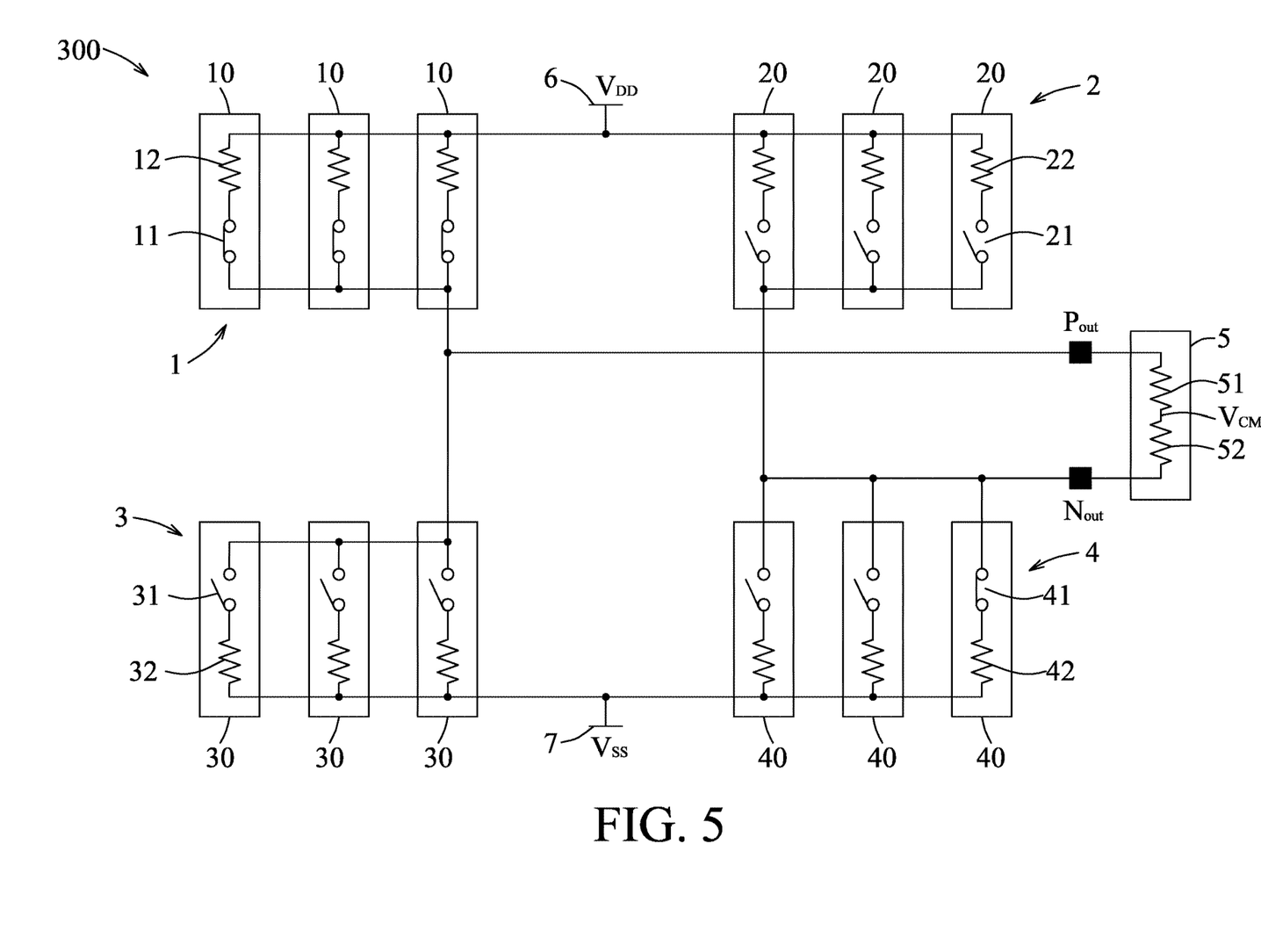
FIG. 5 is a schematic circuit diagram illustrating a second embodiment of a voltage mode transmitter according to the disclosure.

FIG. 5 illustrates a second embodiment of a voltage mode transmitter 300 according to this disclosure, and shows the same circuit structure as FIG. 1. The second embodiment differs from the first embodiment in that the switches 11, 21, 31, 41 are controlled such that an output resistance seen into the first output terminal P$_{out}$ is different from an output resistance seen into the second output terminal N$_{out}$. In this embodiment, one and only one of the first number and the second number is zero, and one and only one of the third number and the fourth number is zero. The first number is greater than zero when the fourth number is greater than zero, and vice versa. The second number is greater than zero when the third number is greater than zero, and vice versa. In a case that the resistors 12, 22, 32, 42 have the same resistance, the sum of the first number and the third number is different from the sum of the second number and the fourth number, i.e., the first number is different from the fourth number when the first number and the fourth number are greater than zero, and the second number is different from the third number when the second number and the third number are greater than zero. This configuration makes an equivalent resistance between the first output terminal P$_{out}$ and one of the first voltage source 6 and the second voltage source 7 different from an equivalent resistance between said second output terminal N$_{out}$ and the other one of the first voltage source 6 and the second voltage source 7, so the resultant common-mode voltage deviates from the average of the first voltage and the second voltage.

In FIG. 5 where the voltage mode transmitter 300 is exemplified to output the differential signal of logic 1 and it is assumed that the resistors 12, 22, 32, 42 have the same resistance of 3×R$_M$, all of the switches 11 conduct (i.e., the first number is 3), none of the switches 21 conducts (i.e., the second number is 0), none of the switches 31 conducts (i.e., the third number is 0), and one of the switches 41 conducts (i.e., the fourth number is 1). It is evident that the common-mode voltage of the differential signal can be calculated according to:

$$V_{CM} = (V_{DD} - V_{SS}) \times \frac{R_{52} + R_{42}}{(R_{12} // R_{12} // R_{12}) + R_{51} + R_{52} + R_{42}} + V_{SS}$$

In this embodiment, V$_{SS}$=0V, so V$_{CM}$=2V$_{DD}$/3, deviating from the average of the first voltage and the second voltage.

When the voltage mode transmitter 300 outputs the differential signal of logic 0, it can be controlled that none of the switches 11 conducts (i.e., the first number is 0), three of the switches 21 conduct (i.e., the second number is 3), one of the switches 31 conducts (i.e., the third number is 1), and none of the switches 41 conducts (i.e., the fourth number is 0).

The second embodiment proposes an approach to adjusting the common-mode voltage of the differential signal outputted to the load 5 while reducing the power consumption due to larger overall resistance, and is suitable for applications of low data rate.

It is noted that this disclosure is not limited to using the switch-resistor units 10, 20, 30, 40, 90 to adjust the impedance of the impedance adjusting circuits 1, 2, 3, 4, 9. Other conventional ways to make the impedance of the impedance adjusting circuits 1, 2, 3, 4, 9 adjustable can also be applied to this disclosure in order to achieve similar effects. In some embodiments, each of the first switch-resistor units 10 and the second switch-resistor units 20 can be replaced by a P-type MOSFET, and each of the third switch-resistor units 30 and the fourth switch-resistor units 40 can be replaced by an N-type MOSFET. For each of the P-type MOSFETs and the N-type MOSFETs, the equivalent impedance thereof is adjustable by controlling a gate voltage thereof.

To sum up, the embodiments of the voltage mode transmitter of this disclosure use switch control to adjust the common-mode voltage of the differential signal, and additional circuits, such as low-dropout (LDO) regulator or current source circuits, are not required, so a capacitance load of the voltage mode transmitter can be minimized. Specifically, the first embodiment maintains impedance matching and thus is suitable for high-speed applications, and the second embodiment has lower power consumption and is suitable for low-speed applications.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for controlling operation of a voltage mode transmitter that has:
    a first output terminal at which a first output signal is provided,
    a second output terminal at which a second output signal is provided, the second output signal cooperating with the first output signal to form a differential signal that has a common-mode voltage;
    a first adjustable impedance between the first output terminal and a first voltage source that provides a first voltage;
    a second adjustable impedance between the second output terminal and the first voltage source;
    a third adjustable impedance between the first output terminal and a second voltage source that provides a second voltage different from the first voltage; and
    a fourth adjustable impedance between the second output terminal and the second voltage source;
    the method comprising steps of:
    A) controlling the first adjustable impedance, the second adjustable impedance, the third adjustable impedance and the fourth adjustable impedance to respectively have a first impedance value, a second impedance value, a third impedance value and a fourth impedance value during a first operation period where the voltage mode transmitter outputs a first logic value;
    B) controlling the first adjustable impedance, the second adjustable impedance, the third adjustable impedance and the fourth adjustable impedance to respectively have the second impedance value, the first impedance value, a fourth impedance value and the third impedance value during a second operation period where the voltage mode transmitter outputs a second logic value that is different from the first logic value;
    wherein one of a first operation condition and a second operation condition is satisfied;
    wherein the first operation condition is that the first impedance value is different from the fourth impedance value, and the second impedance value and the third impedance value cause the common-mode voltage of the differential signal to deviate from an average of the first voltage and the second voltage; and
    wherein the second operation condition is that the second impedance value is different from the third impedance value, and the first impedance value and the fourth impedance value cause the common-mode voltage of the differential signal to deviate from the average of the first voltage and the second voltage.

2. The method of claim 1, wherein:
    the first adjustable impedance is formed by a plurality of first switch-resistor units, each including a switch and a resistor that are connected in series between the first output terminal and the first voltage source;
    the second adjustable impedance is formed by a plurality of second switch-resistor units, each including a switch and a resistor that are connected in series between the second output terminal and the first voltage source;
    the third adjustable impedance is formed by a plurality of third switch-resistor units, each including a switch and a resistor that are connected in series between the first output terminal and the second voltage source; and
    the fourth adjustable impedance is formed by a plurality of fourth switch-resistor units, each including a switch and a resistor that are connected in series between the second output terminal and the second voltage source;
    wherein step A) includes sub-steps of:
    A-1) controlling M number of the first switch-resistor units out of all of the first switch-resistor units to simultaneously permit current to flow therethrough to make the first adjustable impedance have the first impedance value;
    A-2) controlling N number of the second switch-resistor units out of all of the second switch-resistor units to simultaneously permit current to flow therethrough to make the second adjustable impedance have the second impedance value;

A-3) controlling P number of the third switch-resistor units out of all of the third switch-resistor units to simultaneously permit current to flow therethrough to make the third adjustable impedance have the third impedance value; and A-4) controlling Q number of the fourth switch-resistor units out of all of the fourth switch-resistor units to simultaneously permit current to flow therethrough to make the fourth adjustable impedance have the fourth impedance value;

wherein sub-steps A-1), A-2), A-3) and A-4) are performed simultaneously during the first operation period;

wherein step B) includes sub-steps of:

B-1) controlling N number of the first switch-resistor units out of all of the first switch-resistor units to simultaneously permit current to flow therethrough to make the first adjustable impedance have the second impedance value;

B-2) controlling M number of the second switch-resistor units out of all of the second switch-resistor units to simultaneously permit current to flow therethrough to make the second adjustable impedance have the first impedance value;

B-3) controlling Q number of the third switch-resistor units out of all of the third switch-resistor units to simultaneously permit current to flow therethrough to make the third adjustable impedance have the fourth impedance value; and B-4) controlling P number of the fourth switch-resistor units out of all of the fourth switch-resistor units to simultaneously permit current to flow therethrough to make the fourth adjustable impedance have the third impedance value;

wherein sub-steps B-1), B-2), B-3) and B-4) are performed simultaneously during the second operation period; and wherein M, N, P and Q are integers, three or all of M, N, P and Q are greater than zero.

3. The method of claim 2, wherein the resistors of the first, second, third and fourth switch-resistor units have a same resistance, and a sum of M and P is equal to a sum of N and Q.

4. The method of claim 3, wherein M is different from Q, and N is different from P.

5. The method of claim 1, the voltage mode transistor further includes a fifth adjustable impedance between the first output terminal and the second output terminal through said fifth impedance adjusting circuit, the method further comprising: controlling the fifth adjustable impedance to have a constant impedance value during each of the first operation period and the second operation period;

wherein an output resistance seen into the first output terminal is formed cooperatively by the first adjustable impedance, the third adjustable impedance and the fifth adjustable impedance, and is equal to an output resistance seen into the second output terminal that is formed cooperatively by the second adjustable impedance, the fourth adjustable impedance and the fifth adjustable impedance.

6. The method of claim 5, wherein:

the first adjustable impedance is formed by a plurality of first switch-resistor units, each including a switch and a resistor that are connected in series between the first output terminal and the first voltage source;

the second adjustable impedance is formed by a plurality of second switch-resistor units, each including a switch and a resistor that are connected in series between the second output terminal and the first voltage source;

the third adjustable impedance is formed by a plurality of third switch-resistor units, each including a switch and a resistor that are connected in series between the first output terminal and the second voltage source;

the fourth adjustable impedance is formed by a plurality of fourth switch-resistor units, each including a switch and a resistor that are connected in series between the second output terminal and the second voltage source;

the fourth adjustable impedance is formed by a plurality of fifth switch-resistor units, each including at least one switch and at least one resistor that are connected in series between the first output terminal and the second output terminal;

wherein step A) includes sub-steps of:

A-1) controlling M number of the first switch-resistor units out of all of the first switch-resistor units to simultaneously permit current to flow therethrough to make the first adjustable impedance have the first impedance value;

A-2) controlling N number of the second switch-resistor units out of all of the second switch-resistor units to simultaneously permit current to flow therethrough to make the second adjustable impedance have the second impedance value;

A-3) controlling P number of the third switch-resistor units out of all of the third switch-resistor units to simultaneously permit current to flow therethrough to make the third adjustable impedance have the third impedance value;

A-4) controlling Q number of the fourth switch-resistor units out of all of the fourth switch-resistor units to simultaneously permit current to flow therethrough to make the fourth adjustable impedance have the fourth impedance value; and A-5) controlling R number of the fifth switch-resistor units out of all of the fifth switch-resistor units to simultaneously permit current to flow therethrough to make the fifth adjustable impedance have the fifth impedance value;

wherein sub-steps A-1), A-2), A-3), A-4) and A-5) are performed simultaneously during the first operation period;

wherein step B) includes:

B-1) controlling N number of the first switch-resistor units out of all of the first switch-resistor units to simultaneously permit current to flow therethrough to make the first adjustable impedance have the second impedance value;

B-2) controlling M number of the second switch-resistor units out of all of the second switch-resistor units to simultaneously permit current to flow therethrough to make the second adjustable impedance have the first impedance value;

B-3) controlling Q number of the third switch-resistor units out of all of the third switch-resistor units to simultaneously permit current to flow therethrough to make the third adjustable impedance have the fourth impedance value; and B-4) controlling P number of the fourth switch-resistor units out of all of the fourth switch-resistor units to simultaneously permit current to flow therethrough to make the fourth adjustable impedance have the third impedance value; and B-5) controlling R number of the fifth switch-resistor units out of all of the fifth switch-resistor units to simultaneously permit current to flow therethrough to make the fifth adjustable impedance have the fifth impedance value;

wherein sub-steps B-1), B-2), B-3), B-4) and B-5) are performed simultaneously during the second operation period; and wherein M, N, P, Q and R are integers, R is greater than zero, and three or all of M, N, P and Q are greater than zero.

7. The method of claim 6, wherein the resistors of the first, second, third and fourth switch-resistor units have a same resistance, and an overall resistance of said at least one resistor of each of the fifth switch-resistor units is twice the resistance of each of the resistors of the first, second, third and fourth switch-resistor units; and wherein a sum of M and P is equal to a sum of N and Q.

8. The method of claim 7, wherein M is different from Q, and N is different from P.

9. The method of claim 1, wherein:

the first adjustable impedance is formed by a plurality of first switch-resistor units, each including a switch and a resistor that are connected in series between the first output terminal and the first voltage source;

the second adjustable impedance is formed by a plurality of second switch-resistor units, each including a switch and a resistor that are connected in series between the second output terminal and the first voltage source;

the third adjustable impedance is formed by a plurality of third switch-resistor units, each including a switch and a resistor that are connected in series between the first output terminal and the second voltage source; and the fourth adjustable impedance is formed by a plurality of fourth switch-resistor units, each including a switch and a resistor that are connected in series between the second output terminal and the second voltage source;

wherein step A) includes sub-steps of:

A-1) controlling M number of the first switch-resistor units out of all of the first switch-resistor units to simultaneously permit current to flow therethrough to make the first adjustable impedance have the first impedance value;

A-2) controlling N number of the second switch-resistor units out of all of the second switch-resistor units to simultaneously permit current to flow therethrough to make the second adjustable impedance have the second impedance value;

A-3) controlling P number of the third switch-resistor units out of all of the third switch-resistor units to simultaneously permit current to flow therethrough to make the third adjustable impedance have the third impedance value; and A-4) controlling Q number of the fourth switch-resistor units out of all of the fourth switch-resistor units to simultaneously permit current to flow therethrough to make the fourth adjustable impedance have the fourth impedance value;

wherein sub-steps A-1), A-2), A-3) and A-4) are performed simultaneously during the first operation period;

wherein step B) includes:

B-1) controlling N number of the first switch-resistor units out of all of the first switch-resistor units to simultaneously permit current to flow therethrough to make the first adjustable impedance have the second impedance value;

B-2) controlling M number of the second switch-resistor units out of all of the second switch-resistor units to simultaneously permit current to flow therethrough to make the second adjustable impedance have the first impedance value;

B-3) controlling Q number of the third switch-resistor units out of all of the third switch-resistor units to simultaneously permit current to flow therethrough to make the third adjustable impedance have the fourth impedance value; and B-4) controlling P number of the fourth switch-resistor units out of all of the fourth switch-resistor units to simultaneously permit current to flow therethrough to make the fourth adjustable impedance have the third impedance value;

wherein sub-steps B-1), B-2), B-3) and B-4) are performed simultaneously during the second operation period;

wherein one and only one of M and N is zero;

wherein one and only one of P and Q is zero;

wherein M is greater than zero when Q is greater than zero, and vice versa;

wherein N is greater than zero when P is greater than zero, and vice versa;

wherein, in one of the first operation period and the second operation period, an equivalent resistance between the first output terminal and the first voltage source is different from an equivalent resistance between the second output terminal and the second voltage source; and wherein, in the other one of the first operation period and the second operation period, an equivalent resistance between the first output terminal and the second voltage source is different from an equivalent resistance between the second output terminal and the first voltage source.

10. The method of claim 9, wherein the resistors of the first, second, third and fourth switch-resistor units have a same resistance, M is different from Q when M and Q are greater than zero, and N is different from P when N and P are greater than zero.

* * * * *

UNITED STATES PATENT AND TRADEMARK OFFICE
CERTIFICATE OF CORRECTION

PATENT NO. : 10,999,107 B1
APPLICATION NO. : 16/946250
DATED : May 4, 2021
INVENTOR(S) : Shih-Chun Lin, Ming-Hung Chien and Shu-Chin Chuang Page 1 of 1

It is certified that error appears in the above-identified patent and that said Letters Patent is hereby corrected as shown below:

In the Specification

| | | |
|---|---|---|
| Column 2, | Line 28, | change "resistance Rr" to --resistance $R_M$-- |
| Column 3, | Line 54, | change "$R_{12}/R_{12}//$" to --$R_{12}//R_{12}//$-- |
| Column 5, | Line 39, | change "$R_{93}=R_{12}//$" to --$R_{83}=R_{12}//$-- |

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*